United States Patent
Nekkalapudi

(10) Patent No.: US 9,524,277 B2
(45) Date of Patent: Dec. 20, 2016

(54) EXECUTION AND DISPLAY OF EVENTS IN A PLURALITY OF WEB BROWSERS AND DEVICES SYSTEMS AND METHOD

(71) Applicant: PAYPAL, INC., San Jose, CA (US)

(72) Inventor: Banu Durga Satish Nekkalapudi, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 476 days.

(21) Appl. No.: 13/928,753

(22) Filed: Jun. 27, 2013

(65) Prior Publication Data

US 2015/0007015 A1    Jan. 1, 2015

(51) Int. Cl.
  *G06F 3/14* (2006.01)
  *G06F 17/30* (2006.01)
  *G06F 17/22* (2006.01)

(52) U.S. Cl.
  CPC ..... *G06F 17/2247* (2013.01); *G06F 17/30867* (2013.01); *G06F 3/1454* (2013.01)

(58) Field of Classification Search
  CPC .............. G06F 17/30893; G06F 3/1454; G06F 9/45529
  See application file for complete search history.

(56) References Cited

U.S. PATENT DOCUMENTS

| | | | | |
|---|---|---|---|---|
| 7,933,956 B2* | 4/2011 | Hon | .................. | G06F 17/30058 709/205 |
| 2004/0133639 A1* | 7/2004 | Shuang | ..................... | G06F 8/60 709/204 |
| 2005/0204296 A1* | 9/2005 | Rossler | ............. | G06F 17/30873 715/751 |
| 2005/0262092 A1* | 11/2005 | Beartusk | ........... | G06F 17/30873 |
| 2009/0249216 A1* | 10/2009 | Charka | ............... | G06F 11/3688 715/744 |
| 2010/0306642 A1* | 12/2010 | Lowet | ............... | G06F 17/30873 715/234 |
| 2011/0173589 A1* | 7/2011 | Guttman | ........... | G06F 17/30873 717/125 |
| 2011/0191431 A1* | 8/2011 | Noguchi | ................. | H04L 67/02 709/206 |
| 2012/0210243 A1* | 8/2012 | Uhma | ............... | G06F 17/30893 715/744 |
| 2012/0260195 A1* | 10/2012 | Hon | .................. | G06F 17/30873 715/753 |
| 2013/0014126 A1* | 1/2013 | Zana | ........................ | G06F 9/54 719/313 |

FOREIGN PATENT DOCUMENTS

SE    WO 2014084771 A1 *    6/2014    ....... G06F 17/30873

* cited by examiner

*Primary Examiner* — Scott Baderman
*Assistant Examiner* — Mario M Velez-Lopez
(74) *Attorney, Agent, or Firm* — Haynes and Boone, LLP

(57) ABSTRACT

There is provided systems and method for an execution and display of events in a plurality of web browsers and devices. The methods include receiving an event within a first web browser, wherein the first web browser is connected to a plurality of web browsers, determining an element on the first web browser corresponding to the event, and transmitting, using a hardware processor of a browser display device, the element and the event to the plurality of web browsers for execution by each of the plurality of web browser. The method may further comprise receiving an execution of the event on the plurality of web browsers, and displaying the execution of the event on the plurality of web browsers on a plurality of displays corresponding to each of the plurality of web browsers.

20 Claims, 13 Drawing Sheets

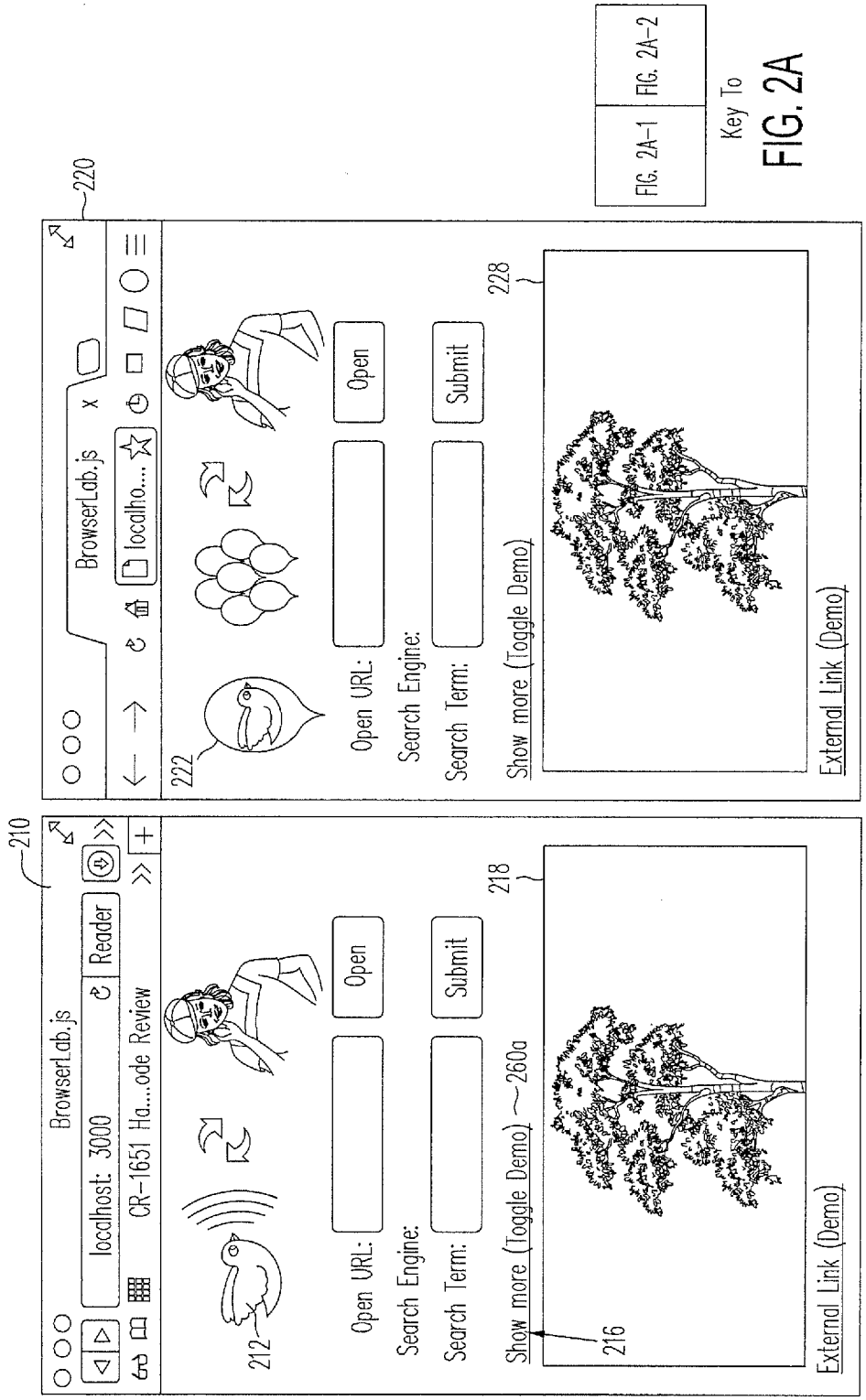

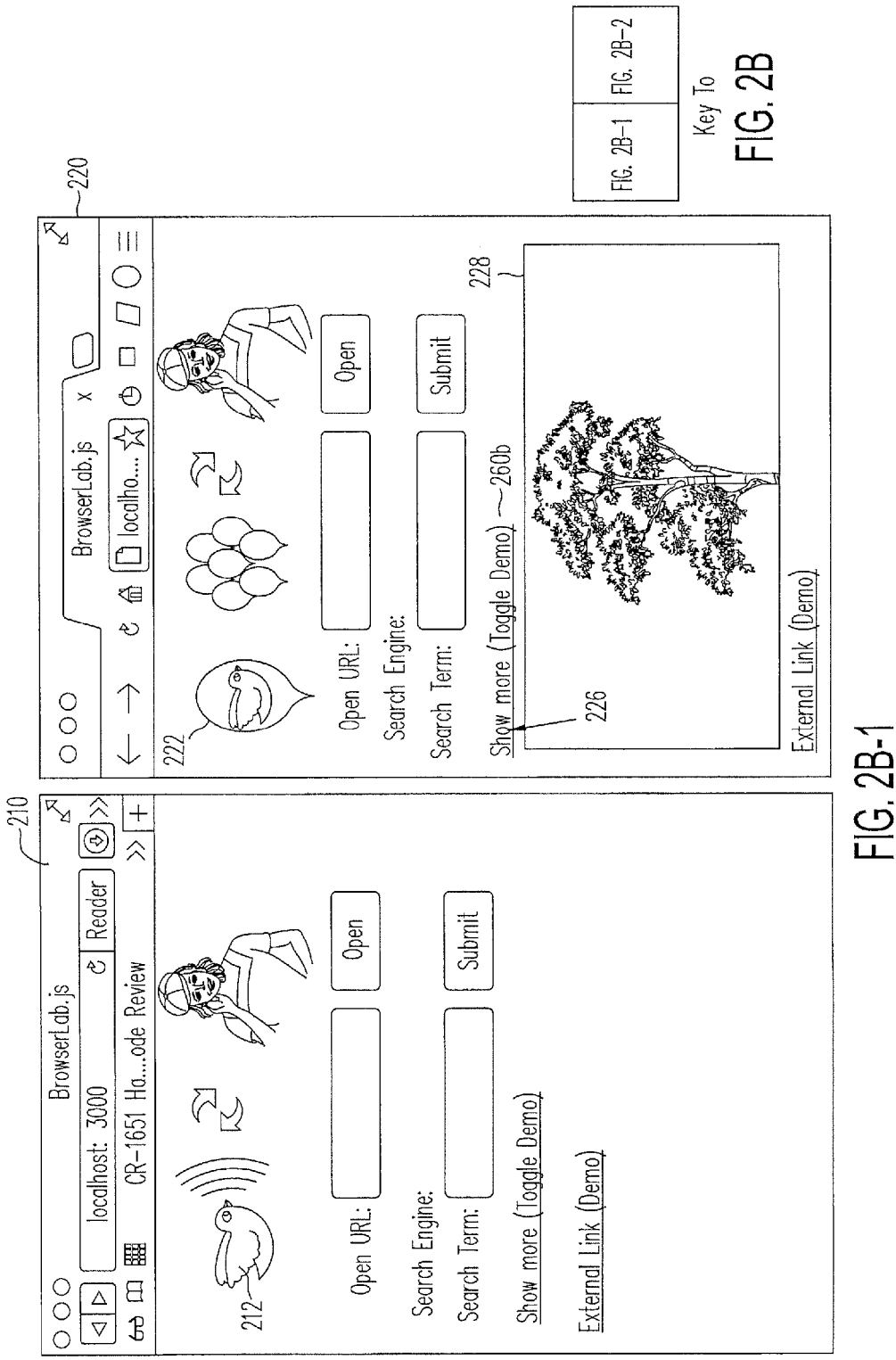

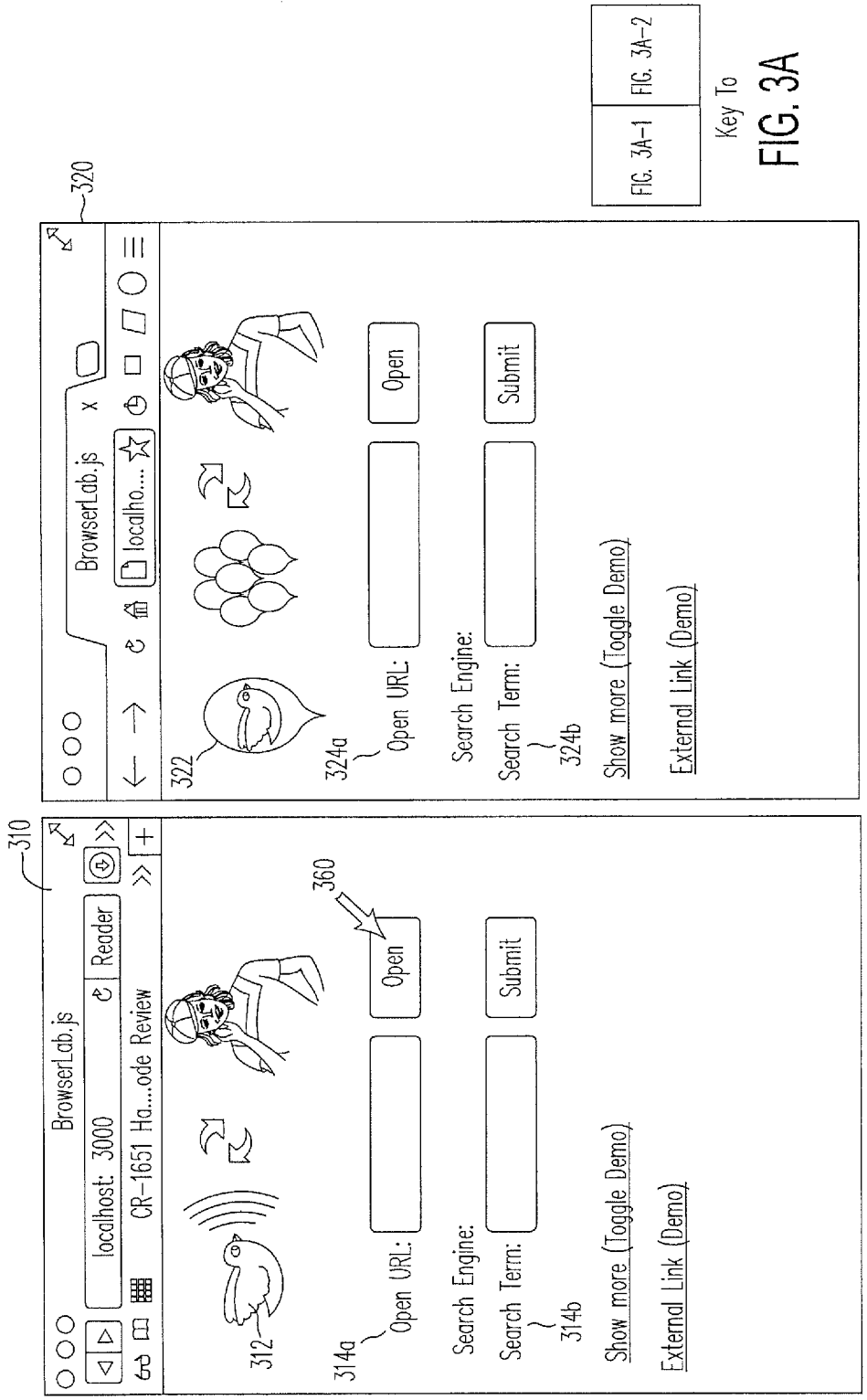

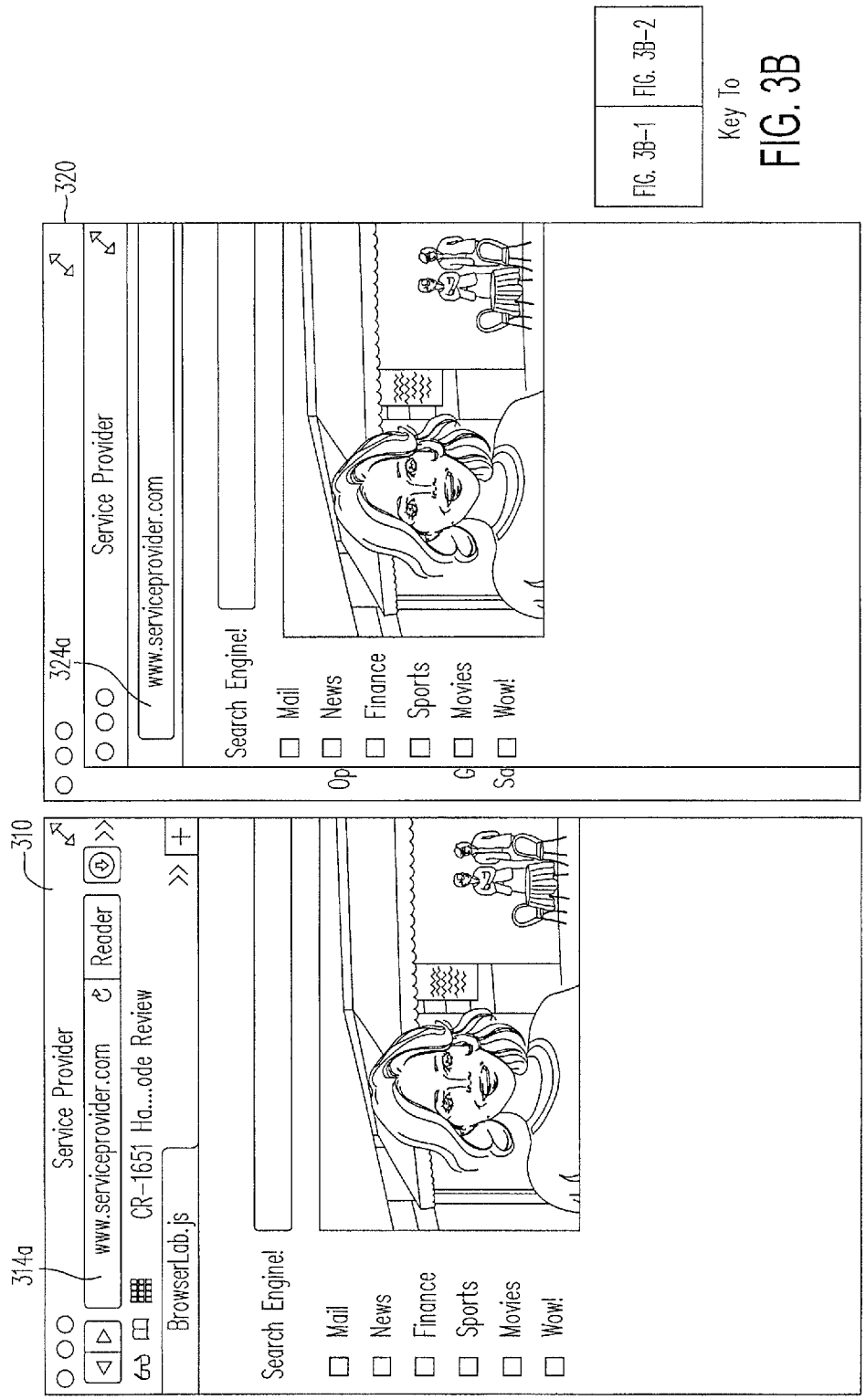

EXECUTION AND DISPLAY OF EVENTS IN A PLURALITY OF WEB BROWSERS AND DEVICES SYSTEMS AND METHOD

BACKGROUND

Technical Field

The present application generally relates to displaying received events in a plurality of web browsers and devices and more specifically to determining elements and events on one browser and executing those events on elements of a plurality of other web browsers and/or devices.

Related Art

Testing products, such as webpages and internet plugins, in multiple browsers and/or on multiple device platforms can be time consuming and difficult. Thus, some prototypes cannot or are not tested on all device and browser platforms. Additionally, many bugs require developers to install specific versions of a browser. This requires the current version of a browser to be deleted since constraints will not allow two version of a browser to co-exist on the same device and browser simulation has thus far failed. Therefore, it is difficult to adequately test responsive web designs except by repeatedly switching devices and browsers.

Figure 1:
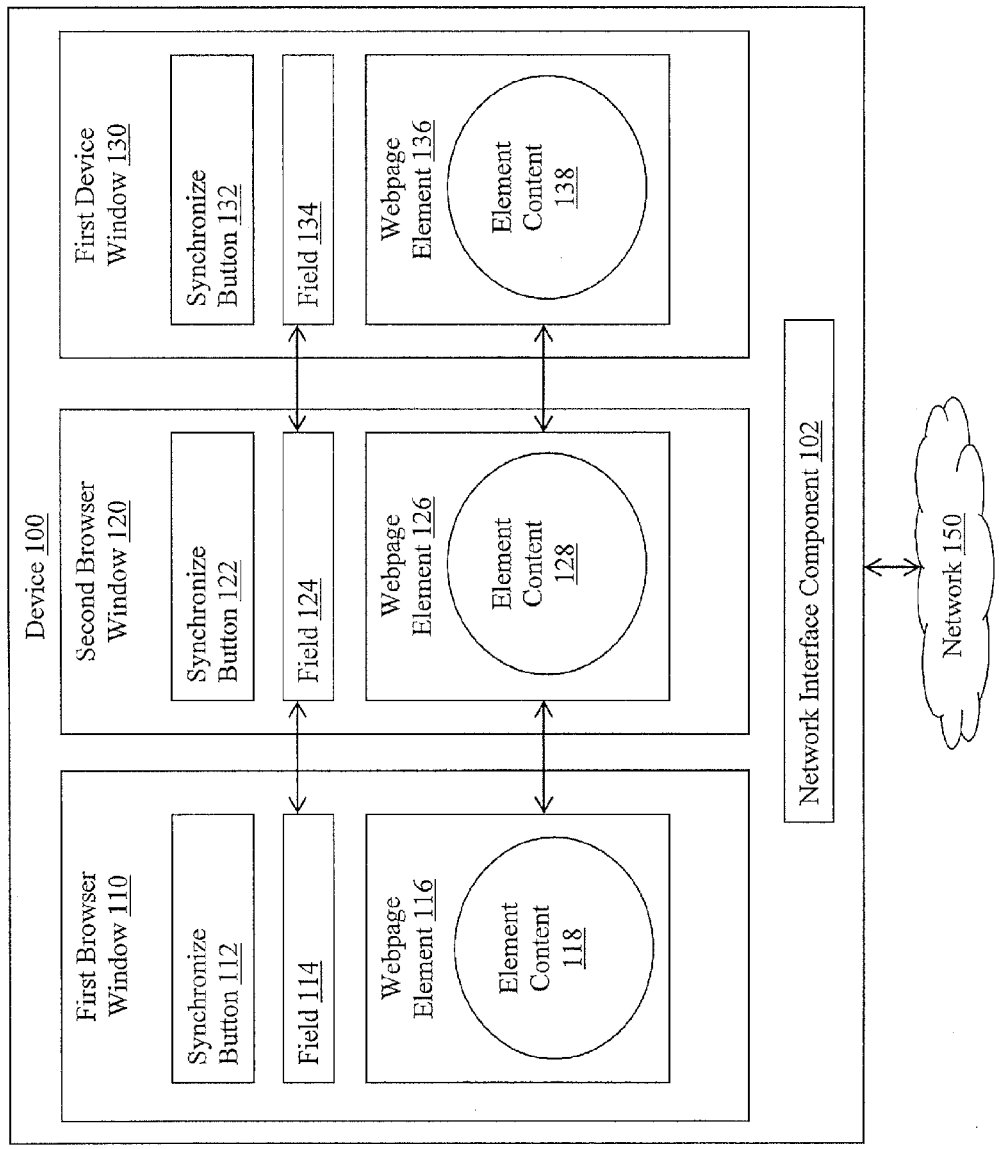
FIG. 1 is a block diagram of an exemplary display containing a first browser window and event occurring in a second browser window and first device window.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In various embodiments, a first web browser is utilized by a user, where the first web browser receives inputs and events, such as mouse-overs, selections, and input submissions. A script may be established to listen and receive steps of these events in the first web browser. The script further connects the first browser to other web browsers and devices in real time, for example, using websockets. Whenever the events occur in the first browser, the script listens to the event and captures a particular element acted on by the event. Then, using websockets, the event is transmitted to each of the other browsers and devices to repeat the same steps. Each resulting event in the other browsers and devices is then displayed to the user, so that the user may test, process, and/or view interactions on multiple platforms.

In certain embodiments, a main browser window will be open where a user performs an action, such as entering a search term in a search box on a webpage, navigating to a URL using a navigation bar of a web browser, or selecting a button or a link. In response, the script may determine the specific element, such as the document object model (DOM) element, corresponding to the event. The element on which the event acts may be captured using a unique identification, a Cascading Style Sheets (CSS) class name, and/or XML path language (Xpath). The event and the DOM element unique identification, CSS class name, and/or Xpath may be transmitted to a plurality of other web browsers and/or other devices implementing the web browsers using websockets in order for those web browsers and/or devices to repeat the same instructions. For example, the event and element may be transmitted to a MICROSOFT INTERNET EXPLORER®, GOOGLE CHROME®, and/or MOZILLA FIREFOX® browser, which are being run by the same device, or on a separate device such as an APPLE IPHONE®. Each of the results may then be displayed to the user on the different web browsers and/or devices.

FIG. 1 is a block diagram of an exemplary display containing a first browser window and event occurring in a second browser window and first device window. As shown, a device 100 may comprise or implement one or a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

FIG. 1 is a block diagram of networked device 100 configured to handle processes in accordance with embodiments provided herein. Device 100 includes a first browser window 110, a second browser window 120, and a first device window 130. First browser window 110 is shown as a first browser where a user performs some action, such as enter text in a field 114, or manipulating a webpage element 116 through clicking on or interacting with an element content 118. Additionally, first browser window contains a synchronize button 112. Similarly, second browser window 120 has a synchronize button 122, a field 124, and a webpage element 126 with an element content 128 while first device window 130 has a synchronize button 132, a field 134, and a webpage element 136 with an element content 138. Note that content on device 100 may be displayed on other user devices (not shown) which are the same or similar to device 100 as described herein.

Device 100 includes one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system environment 100, and/or accessible over network 130.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of device 100.

First browser window 110 of FIG. 1 may include a browser window, such as a web browser, displaying some content, such as a web page. However, in other embodiments, first browser window 110 may display a graphical user interface corresponding to a process or program for detecting webpage elements and events, and executing them on a predetermined webpage using the web browsers and/or devices of second browser window 120 and first device window 130. Generally, first browser window 110 may be maintained by any entity that provides web browser services and/or website services. In this regard, first browser window 110 may include a web browser for accessing webpages and associated content over network 150. In certain embodiments, first web browser 110 may correspond to MICROSOFT INTERNET EXPLORER®, GOOGLE CHROME®, or MOZILLA FIREFOX®, for example.

Synchronize button 112 may correspond to an application interface button that causes a process of the present disclosure to implement methods disclosed below. For example, synchronize button can initiate a script running embodiments of the present disclosure to determine the presently selected browser window as the synchronizing window. Thus, when a user enters in text, manipulates objects, selects links, or performs other actions on elements in first browser window 110, the event will be recorded and a corresponding DOM element determined Then, either through another selection of synchronize button 112, or automatically, the event and the corresponding DOM element can be transmitted to other browser and/or device windows for similar execution of the steps.

In various embodiments, first browser window 110 contains field 114. Field 114 may correspond generally to a field on a web browser or webpage for entering information, such as a navigation bar, a search box, user account login field, selectable menus, or other data field. Field 114 may include some event that occurs on or after entering information, such as web searches, navigation to other pages, additional menu selections, or other event. Actions in field 114 may be viewable on the other connected browsers and devices based on synchronize button 112. For example, if first browser window 110 is selected, using synchronize button 112, as the master browser window to transmit events and corresponding DOM elements, then when a user enters text, selects menus, or otherwise interacts with field 114, the events and field 114 are recorded and transmitted to other browser and device windows to execute the steps of the event on a corresponding DOM element to field 114, for example field 124 and/or field 134.

Additionally, in certain embodiments, first browser window 110 includes webpage element 116 having element content 118. Webpage element 116 may correspond to an interactive webpage element have element content 118, such as a video, game, or other interactive content. Events may occur when a user interacts with webpage element 116, for example if the user selects or places a mouse cursor over element content 118. In various embodiments, webpage element 116 may engage in an interactive game, play a video, begin a recording, or perform other event. When a user engages in some action in webpage element 116, the event and webpage element 116 may be transmitted to other browser and device windows to execute the steps of the event on a corresponding DOM element to webpage element 116, for example webpage element 126 and/or webpage element 136.

In other embodiments, first browser window 110 may further correspond generally to a device window executing an application, for example, a device and/or operating system separate from the device and/or operating system of device 100, executing a web browser. In such embodiments, first browser window 110 can be utilized to enter text, perform actions, or otherwise manipulate the application of the device window in order to transmit those actions and corresponding elements to other browser and/or device windows for similar execution or those steps. Thus, other device and/or browser windows may display those actions and elements on the application of the other device platforms and/or browser windows.

First browser window 110 is displayed next to second browser window 120 on device 110. Additionally, as shown by the arrows in FIG. 1, second browser window 120 contains similar content in field 124 and webpage element 126 as first browser window 110 in field 114 and webpage element 116. As discussed below, second browser window 120 may be configured to execute and display events on corresponding webpage elements as those performed in first browser window 110.

Second browser window 120 of FIG. 1 may include a browser window, such as a web browser, displaying some content, such as a web page. However, in other embodiments, second browser window 120 may display a graphical user interface corresponding to a process or program for detecting webpage elements and events, and executing them on a predetermined webpage using the web browsers and/or devices of first browser window 110 and first device window 130. Generally, second browser window 120 may be maintained by any entity that provides web browser services and/or website services. In this regard, second browser window 120 may include a web browser for accessing webpages and associated content over network 150. In certain embodiments, second browser window 120 may correspond to MICROSOFT INTERNET EXPLORER®, GOOGLE CHROME®, or MOZILLA FIREFOX®, for example.

Synchronize button 122 may correspond to an application interface button that causes a process of the present disclosure to implement methods disclosed below. For example, synchronize button can initiate a script running embodiments of the present disclosure to determine the presently selected browser window as the synchronizing window. Thus, when a user enters in text, manipulates objects, selects links, or performs other actions with corresponding events in second browser window 120, the event will be recorded and a corresponding DOM element determined. Then, either through another selection of synchronize button 122, or automatically, the event and the corresponding DOM element can be transmitted to other browser and device windows and/or displays on other devices for similar execution of the steps.

However, in other embodiments, where first browser window 110 is set as the master window to record an event and corresponding element and transmit the event and a DOM element to second browser window 120, synchronize button 122 may be selected so that second browser window 120 listens for and receives the event and DOM element using, for example, websockets. Thus, when synchronize button 122 is set to listen to first browser window 110, second browser window 120 may receive a set of instructions as an event, and a corresponding DOM element to act on, and perform the steps from first browser window 110 in second browser window 120.

In various embodiments, second browser window 120 contains field 124. Field 124 may correspond generally to a field on a web browser or webpage for entering information, such as a navigation bar, a search box, user account login field, selectable menus, or other data field. Webpage field may include some event that occurs on or after entering information, such as web searches, navigation to other pages, additional menu selections, or other event. Field 124 may be viewable on other connected browsers and devices based on synchronize button 122. For example, if second browser window 120 is selected, using synchronize button 122, as the master browser window to transmit events and corresponding DOM elements, then when a user enters text, selects menus, or otherwise interacts with field 124, the events and field 124 are recorded and transmitted to other browser and device windows to execute the steps of the event on a corresponding element to field 124, for example field 114 and/or field 134.

In other embodiments, an event acted on website field 114 of first browser window 110 is transmitted to second browser window 120. In such embodiments, second browser window 120 may perform the steps of the event on website field 124 and display the results for a user to view on the browser platform of second browser window 120. In certain embodiments, first browser window 110 and second browser window 120 may be connected using, for example, websockets. Websockets enable two way communications between the browsers. When synchronize button 112 and synchronize button 122 are set to receive actions in first browser window 110 and repeat them in second browser window 120, an event may be captured in first browser window 110. A DOM element may be determined that is acted on by the event and transmitted to second browser window 120 for execution of the steps of the event on the corresponding DOM element.

Additionally, in certain embodiments, second browser window 120 includes webpage element 126 having element content 128. Webpage element 126 may correspond to an interactive webpage element have element content 128, such as a video, game, or other interactive content. Events may occur when a user interacts with webpage element 126, for example if the user selects or places a mouse cursor over element content 128. In various embodiments, webpage content 126 may engage in an interactive game, play a video, begin a recording, or perform other event. When a user engages in some actions in webpage element 126, the event and webpage element 126 may be transmitted to other browser and device windows to execute the steps of the event on a corresponding webpage element to webpage element 126, for example webpage element 116 and/or webpage element 136.

However, in other embodiments, an event acted on webpage element 116, such as interaction with webpage content 118, of first browser window 110 is transmitted to second browser window 120. In such embodiments, second browser window 120 may perform the steps of the event on webpage element 126 and display the results for a user to view on the browser platform of second browser window 120. For example, as previously discussed, first browser window 110 and second browser window 120 may be connected using, for example, websockets, where second browser window 120 receives a event and DOM element from first browser window 110 to execute in second browser window 120.

First browser window 110 and second browser window are displayed next to first device window 130 on device 110. Additionally, as shown by the arrows in FIG. 1, first device window 130 contains similar content in field 124 and webpage element 126 as first browser window 110 in field 114 and webpage element 116 and second browser window 120 in field 124 and webpage element 126. As discussed below, first device window 130 may be configured to execute and display events on corresponding DOM elements as those performed in first browser window 110 and/or second browser window 120.

First device window 130 of FIG. 1 may include a device window, such as a display of a user device, displaying some content using a device application, such as a web page through a device web browser. Generally, first device window 130 may be displayed as a user device executing an application. In this regard, first device window 130 may include a mobile device executing a device web browser for accessing webpages and associated content over network 150. However, in other embodiments, first device window 130 may display a graphical user interface corresponding to a process or program for detecting webpage elements and events, and executing them on a predetermined webpage using the web browsers and/or devices of first browser window 110 and second browser window 120. In certain embodiments, first device window 130 may correspond to APPLE SAFARI® executing on an APPLE IPHONE® or Opera on a GOOGLE ANDROID® platform, for example. Thus, first device window 130 may show a separate operating system from first browser window 110 and/or second browser window 120 executing the same or different web browser from first browser window 110 and/or second browser window 120.

Synchronize button 132 may correspond to an application interface button that causes a process of the present disclosure to implement methods disclosed below. For example, synchronize button can initiate a script running embodiments of the present disclosure to determine the presently selected browser window as the synchronizing window. Thus, when a user enters in text, manipulates objects, selects links, or performs other actions with corresponding events in first device window 130, the event will be recorded and a DOM element determined Then, either through another selection of synchronize button 132, or automatically, the event and the DOM element can be transmitted to other browser and device windows and/or displays on other devices for similar execution of the steps.

However, in other embodiments, where first browser window 110 is set as the master window to record an event and corresponding element and transmit the event and a DOM element to first device window 130, synchronize button 132 may be selected so that first device window 130 listens for and receives the event and DOM element using, for example, websockets. Thus, when synchronize button 132 is set to listen to first browser window 110, first device window 130 may receive a set of instructions as an event, and a corresponding DOM element to act on, and perform the steps from first browser window 110 in first device window 130.

In various embodiments, first device window 130 contains field 134. Field 134 may correspond generally to a field on a web browser or webpage for entering information, such as a navigation bar, a search box, user account login field, selectable menus, or other data field. Webpage field may include some event that occurs on or after entering information, such as web searches, navigation to other pages, additional menu selections, or other event. Field 134 may be viewable on other connected browsers and devices based on synchronize button 132. For example, if first device window 130 is selected, using synchronize button 132, as the master browser window to transmit events and corresponding DOM elements, then when a user enters text, selects menus, or otherwise interacts with field 134, the events and field 134 are recorded and transmitted to other browser and device windows to execute the steps of the event on a corresponding webpage element to field 134, for example field 114 and/or field 124.

In other embodiments, an event acted on field 114 of first browser window 110 is transmitted to first device window 130. In such embodiments, first device window 130 may perform the steps of the event on field 134 and display the results for a user to view on the browser platform of first device window 130. In certain embodiments, first browser window 110 and first device window 130 may be connected using, for example, websockets. Websockets enable two way communications between the browser and the device application, for example the device browser. When synchronize button 112 and synchronize button 132 are set to receive actions in first browser window 110 and repeat them in first device window 130, an event may be captured in first browser window 110. A DOM element may be determined that is acted on by the webpage event and transmitted to first device window 130 for execution of the steps of the webpage event on the corresponding element.

Additionally, in certain embodiments, first device window 130 includes webpage element 136 having element content 138. Webpage element 136 may correspond to an interactive webpage element have element content 138, such as a video, game, or other interactive content. Events may occur when a user interacts with webpage element 136, for example if the user selects or places a mouse cursor over element content 138. In various embodiments, webpage content 138 may engage in an interactive game, play a video, begin a recording, or perform other event. When a user engages in some actions in webpage element 136, the event and webpage element 136 may be transmitted to other browser and device windows to execute the steps of the event on a corresponding webpage element to webpage element 136, for example webpage element 116 and/or webpage element 126.

However, in other embodiments, an event acted on webpage element 116, such as interaction with webpage content 118, of first browser window 110 is transmitted to first device window 130. In such embodiments, first device window 130 may perform the steps of the event on webpage element 136 and display the results for a user to view on the browser platform of first device window 130. As previously discussed, first browser window 110 and first device window 130 may be connected using, for example, websockets, where first device window 130 receives a webpage event and DOM element from first browser window 110 to execute in first device window 130.

In various embodiments, device 100 includes at least one network interface component (NIC) 102 adapted to communicate with network 150 including other devices and servers for the execution of the disclosed processes. In various embodiments, network interface component 102 may comprise a DSL (e.g., Digital Subscriber Line) modem, a PSTN (Public Switched Telephone Network) modem, an Ethernet device, a broadband device, a satellite device, and/or various other types of wired and/or wireless network communication devices including microwave, radio frequency (RF), and infrared (IR) communication devices.

Figures 2, 2A:
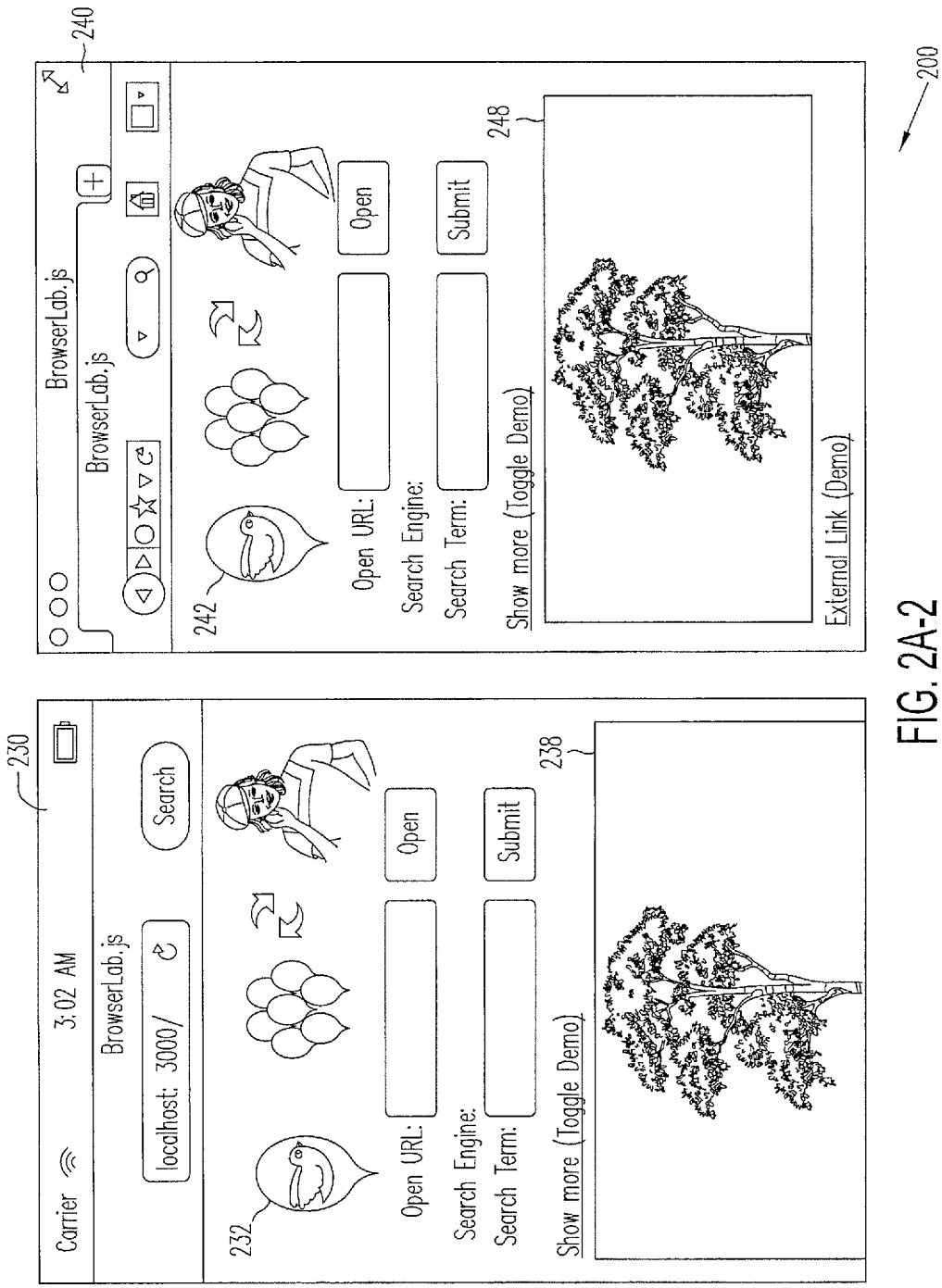
FIG. 2A is a screenshot of an exemplary action taken in a master designated browser and repeated in a plurality of browser and device windows.

FIG. 2A is a screenshot of an exemplary action taken in a master browser and repeated in a plurality of browser and device windows. FIG. 2A displays a device 200 having a first browser window 210, a second browser window 220, a first device window 230, and a third browser window 240. Each window is shown with a synchronize button 212, 222, 232, and 242, respectively. Additionally, first browser window 210 is shown with a user action 260a interacting with a webpage element 216 to cause display of webpage content 218 in first browser window 210, and display of webpage contents 228, 238, and 248 in second browser window 220, first device window 230, and third browser window 240, respectively.

In FIG. 2A, each of first browser window 210, second browser window 220, first device window 230, and third browser window 240 have a corresponding synchronize button 212, 222, 232, and 242, respectively. As shown in FIG. 2A, synchronize button 212 is set to a different icon than synchronize buttons 222, 232, 242 in order to signify to a user of device 200 that first browser window 210 is set as a master browser window to receive webpage events on webpage elements, and transmit the steps of the webpage event and DOM element corresponding to the webpage element to second browser window 220, first device window 230, and third browser window 240.

FIG. 2A shows an example where a user has performed user action 260a corresponding to selecting a webpage element. User action 260a, shown in FIG. 2A as a cursor over webpage element 216, may correspond to a webpage event, such as selection of webpage element 216 through clicking, mouse over, or other selection action. Thus, user action 260a may correspond to some receivable webpage event initiated by a user. In FIG. 2A, selection of webpage element 216 causes display of webpage content 218.

According to FIG. 2A, once the event corresponding to user action 260a has been received, a script listening records the event acting on webpage element 216 and determines a DOM element. The script may determine the webpages particular DOM element acted on by the event using a unique identification, a CSS class name, and/or Xpath. The DOM element ID, CSS class name, and/or Xpath is then transmitted with the steps of the event to second browser window 220, first device window 230, and/or third device window 240. As shown in FIG. 2A, this causes display of webpage content 228, 238, and 248.

Figures 2, 2B:
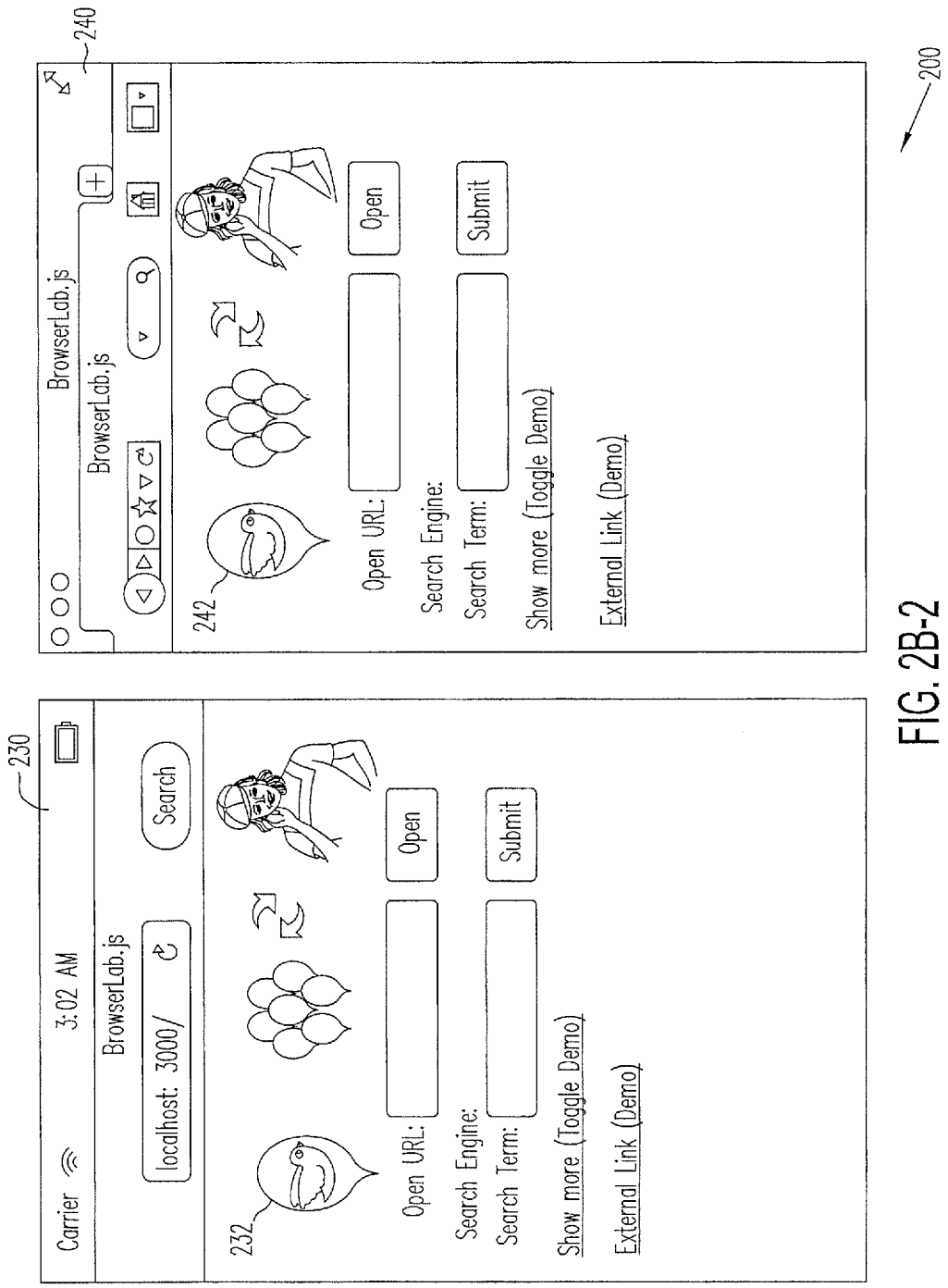
FIG. 2B shows an action taken in a non-master designated window without repeating in a plurality of browser and device windows.

FIG. 2B shows an action taken in a non-master designated window without repeating in a plurality of browser and device windows. FIG. 2B displays a device 200 having a first browser window 210, a second browser window 220, a first device window 230, and a third browser window 240. Each window is shown with a synchronize button 212, 222, 232, and 242, respectively. Additionally, second browser window 220 is shown with user action 260b interacting with webpage element 226 to cause display of a webpage content 228 in second browser window 220. However, FIG. 2B does not cause display of webpage contents in first browser window 210, first device window 230, and third browser window 240.

In FIG. 2B, synchronize button 222 of second browser window 220 has not been selected to designate second browser window 220 as the master window. As can be seen in comparison to FIG. 2A, synchronize button 212 remains the same, and designated as the master window while synchronize button 222 shows second browser window 220 as a responsive window. Thus, when a user initiates user action 260b on webpage element 226, webpage content 228 is displayed. However, the corresponding DOM element and webpage event are not transmitted to first browser window 210, first device window 230, and third browser window 240.

Figures 2, 3A:
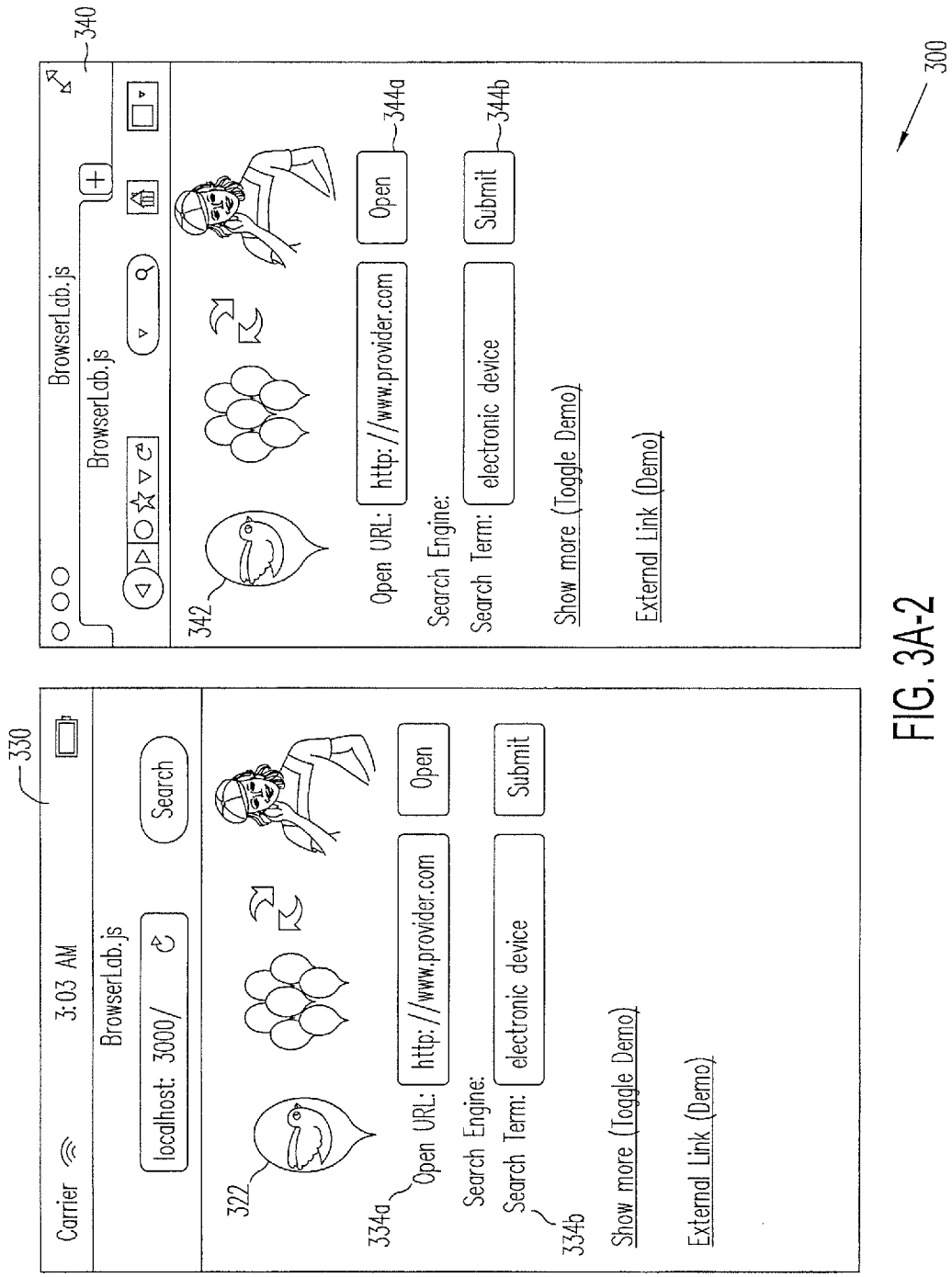
FIG. 3A is a screenshot of an exemplary URL navigation prior to execution in a master window.

FIG. 3A is a screenshot of an exemplary URL navigation prior to execution in a master window. Shown in FIG. 3A is a device 300 having a first browser window 310, a second browser window 320, a first device window 330, and a third browser window 340. Each window is shown with a synchronize button 312, 322, 332, and 342, respectively. Additionally, first browser window 310 is shown with fields 314a and 314b, second browser window 320 with fields 324a and 324b, first device window 330 with fields 334a and 334b, and third browser window 340 with fields 344a and 344b. A user action 360 is shown acting on field 314a of first display window 310.

FIG. 3A shows a similar setup to FIG. 2A during execution of a webpage event on webpage elements in a plurality of separate browsers and/or devices. First device window 310 is shown with synchronize button 312 designating first device window 310 as the master window. Fields 314a, 324a, 334a, and 344a, and fields 314b, 324b, 334b, and 344b, correspond to browser and/or webpage fields, for example, a navigation bar field and a search field, respectively, in FIG. 3A.

In FIG. 3A, a user has entered some text corresponding to a URL of a website in field 314a of first browser window 310. Thus, the user wishes to open the URL entered in field 314a using first browser window 310. Additionally, as first browser window 310 is designated as the master browser window, using a similar process described with respect to FIG. 2A/2B, the text entered in field 314a is repeated in field 324b, 334b, and 344b. For example, a script may determine the user typing in field 314a is an event corresponding to a user entering text, and transmit the webpage event and DOM element corresponding to field 314a to second browser window 320, first device window 330, and third device window 340. Thus, second browser window 320, first device window 330, and third device window 340 may enter the same text in field 324a, field 334a, and field 344a, respectively.

After a user enters text into fields 314a, 324a, 334a, and 344a, the user may initiate user action 360, shown here as selecting an open button corresponding to field 314a. When a user selects the open button in user action 360, the event may be received by the script and a DOM element corresponding to the open button may be determined. Once the webpage event and element are known by the script, they may be transferred to second browser window 320, first device window 330, and third device window 340.

The user has also entered text in field 314b, which is copied to field 324b, 334b, and 334b using the above described process. However, as shown in FIG. 3A, the user has chosen to open the URL entered in field 314a, and thus does not search using the terms entered in field 314b.

Figures 2, 3B:
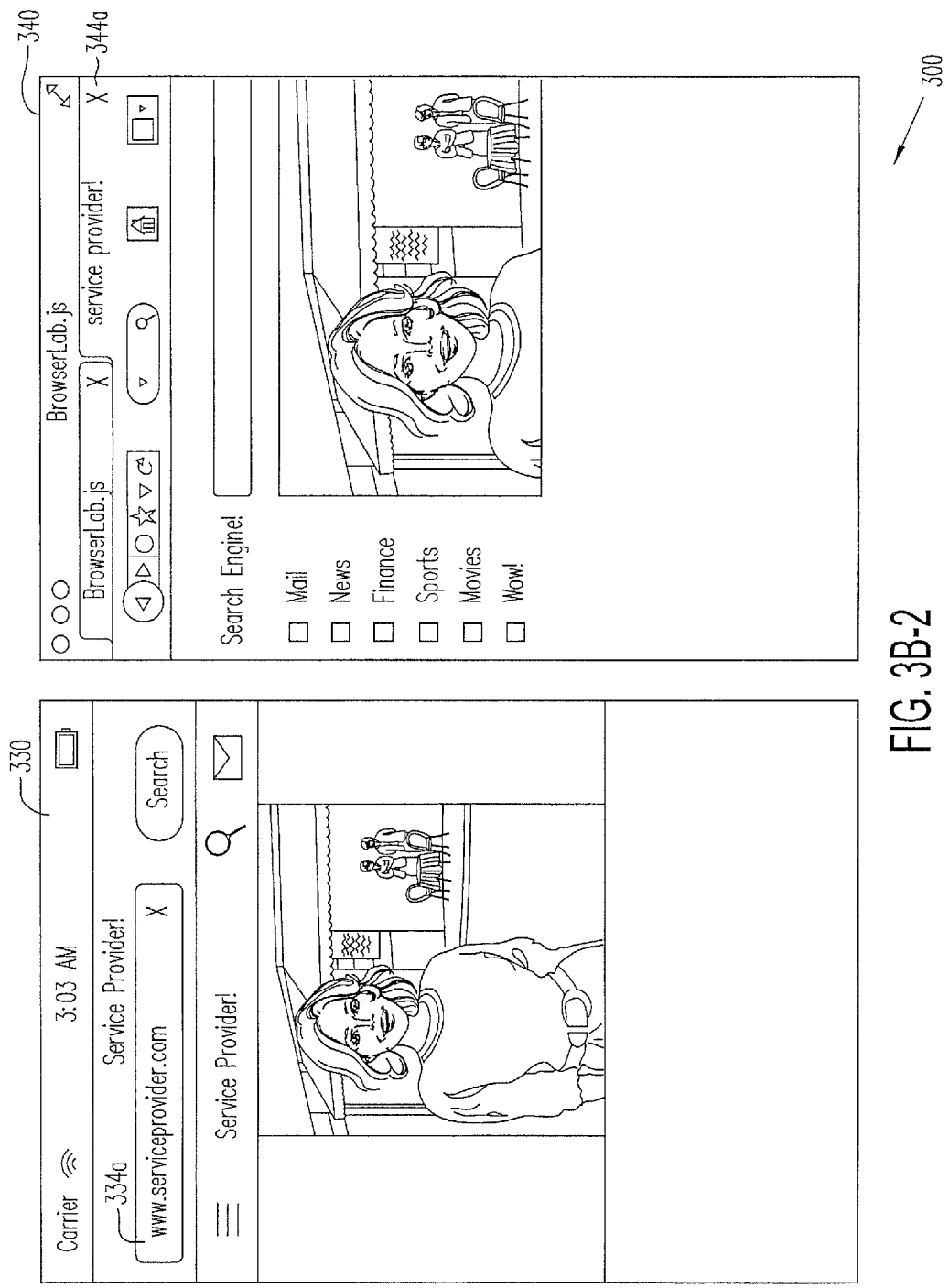
FIG. 3B is a screenshot of the URL navigation in the master browser window of FIG. 3A repeated in a plurality of browser and device windows.

FIG. 3B is a screenshot of the URL navigation in the master browser window of FIG. 3A repeated in a plurality of browser and device windows. A first browser window 310, a second browser window 320, a first device window 330, and a third browser window 340 all display URL's navigated to using the URL designated in fields 314a, 324a, 334a, and 344a.

As shown in FIG. 3B, after a user action 360 of FIG. 3A is initiated, the corresponding webpage event and element is transferred to each of second browser window 320, first device window 330, and third browser window 340. In response, each of second browser window 320, first device window 330, and third browser window 340 execute the same webpage event on a corresponding element. Thus, as shown in FIG. 3B, each of second browser window 320, first device window 330, and third browser window 340 have navigated to the URL designated in field 314a of FIG. 3A, repeated as field 314a of FIG. 3B in the navigation bar of the web browser. Each browser of second browser window 320, first device window 330, and third browser window 340 show similar element 324a, 334, and 344a.

Figures 4, 4A:
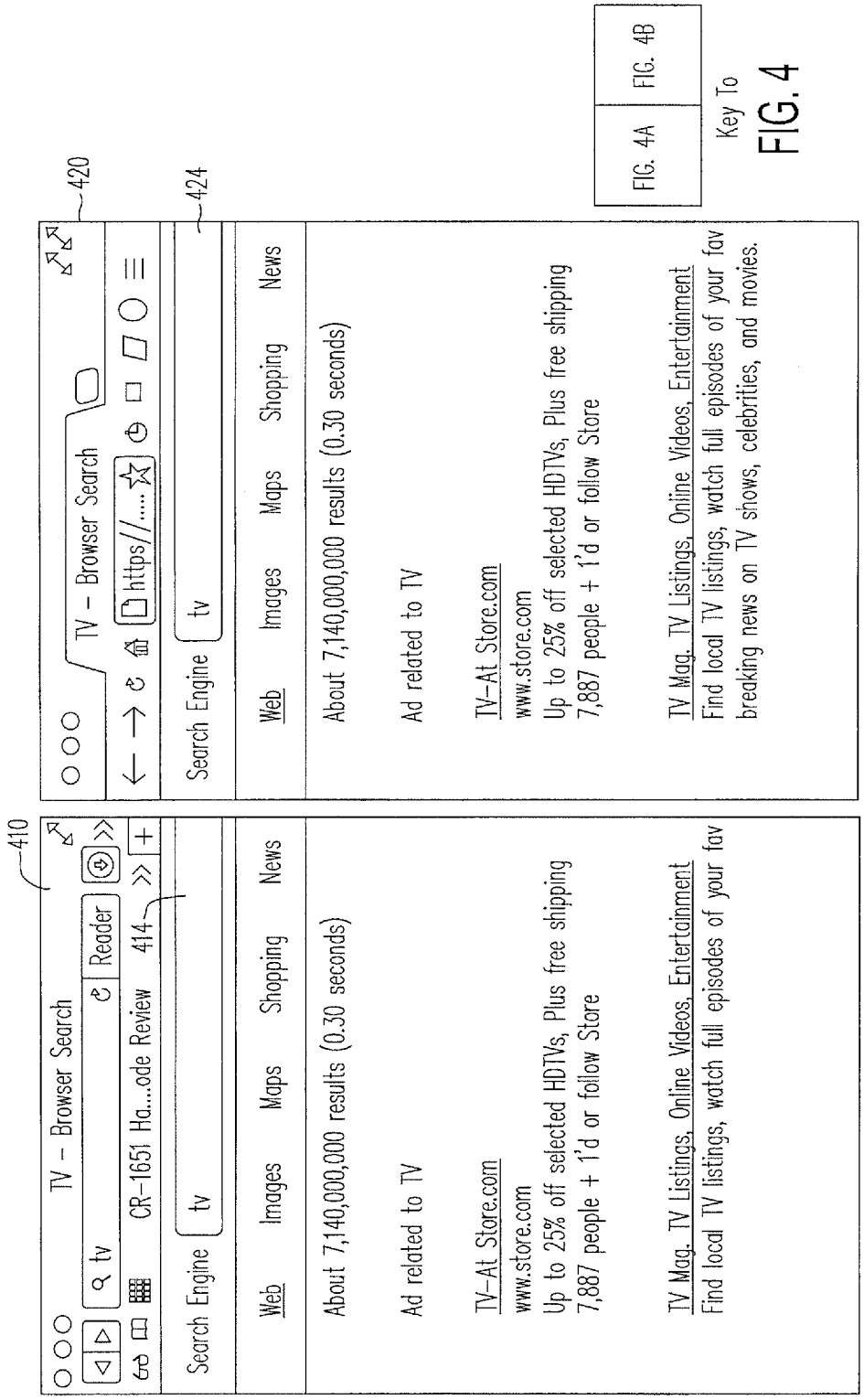
FIG. 4 is a screenshot of an exemplary website search taken in a master browser and repeated in a plurality of browser and device windows.
Figure 4B:
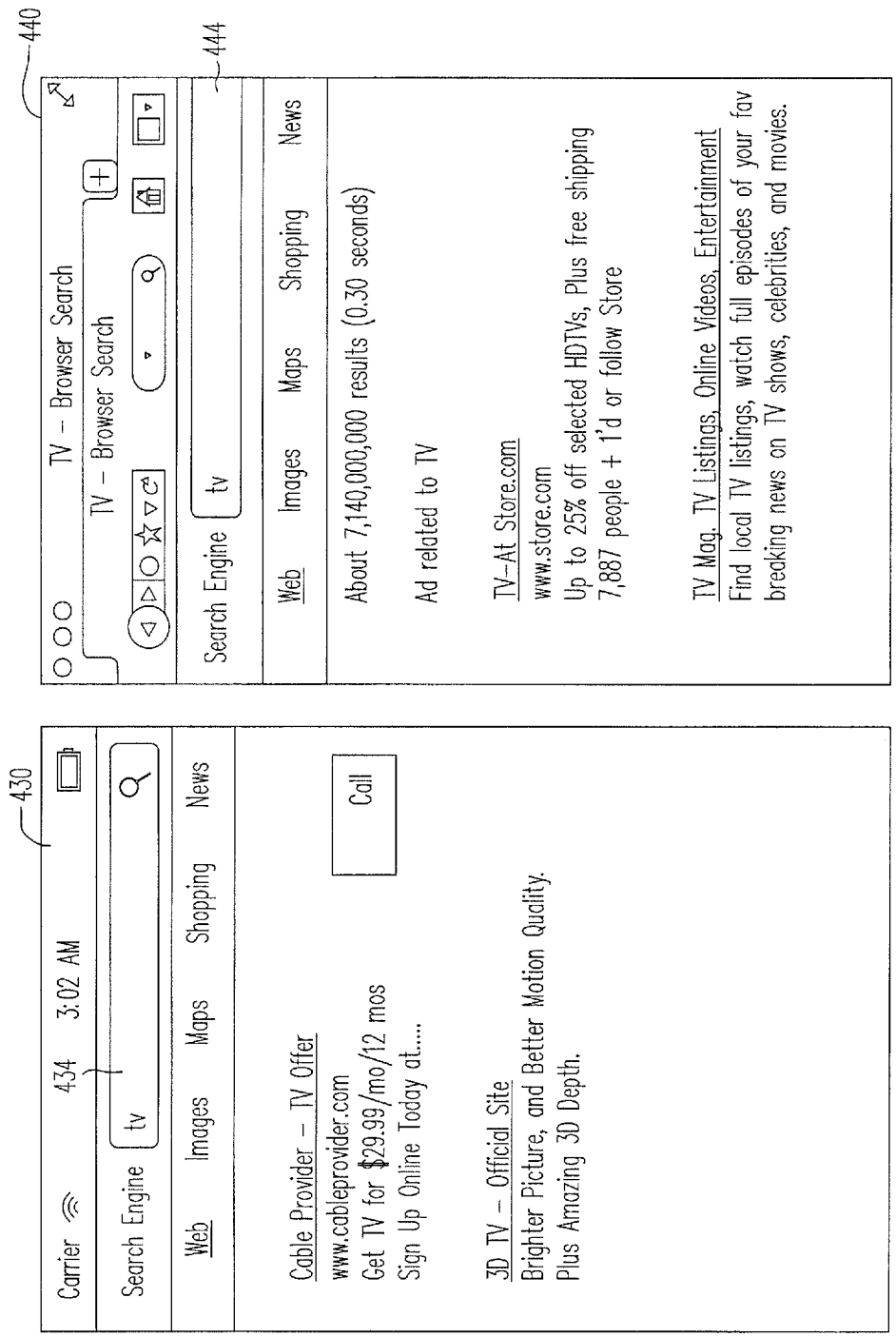

FIG. 4 is a screenshot of an exemplary website search taken in a master browser and repeated in a plurality of browser and device windows. FIG. 4 presents a first browser window 410, a second browser window 420, a first device window 430, and a third browser window 440, each having a search field 414, 424, 434, and 444, respectively.

As shown in FIG. 4, a webpage event and DOM element corresponding to searching the word "TV" have been transmitted from first browser window 410 to second browser window 420, first device window 430, and third browser window 440. As shown in FIG. 4, each of the plurality of browser and/or device windows have executed a search for the term "TV" using the search engine designated by the webpage. Thus, each of first browser window 410, second browser window 420, first device window 430, and third device window 440 have execute a search and are displaying search results. In such a manner, a website search engine may be tested on a plurality of browsers and/or devices.

Figure 5:
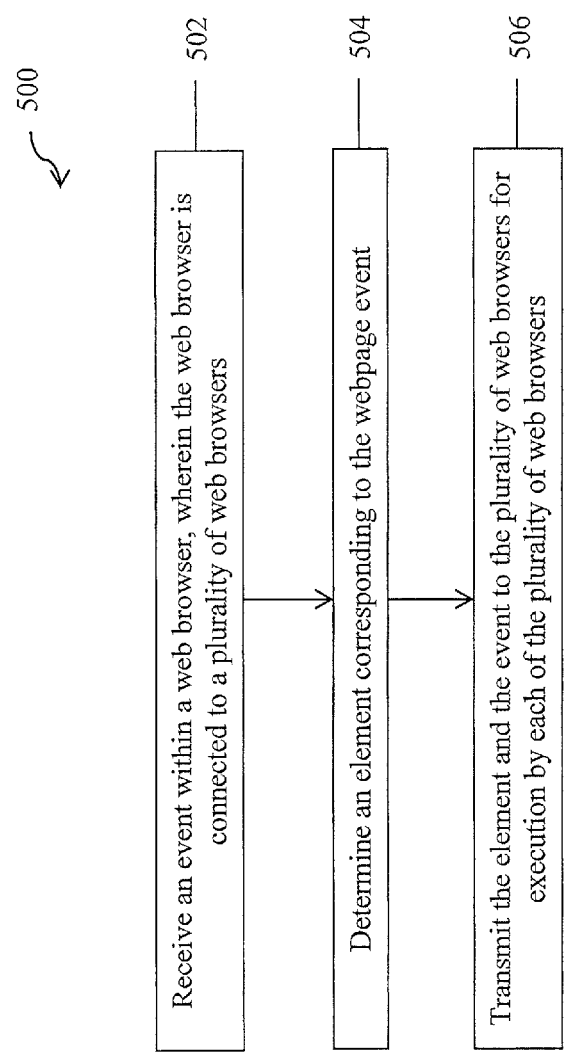
FIG. 5 is a flowchart showing an exemplary process by a device for display of an event in a plurality of web browsers and devices.

FIG. 5 is a flowchart showing an exemplary process by a device for display of an event in a plurality of web browsers and devices. Note that one or more steps, processes, and methods described herein may be omitted, performed in a different sequence, or combined as desired or appropriate.

At step 502, an event is received within a web browser, wherein the web browser is connected to a plurality of web browsers. The event may correspond to some event such as a click, mouse-over, submission (i.e. a text, image, or data submission), game interaction, or other event. The event may include an interaction with a webpage element or may include an interaction with a browser element. The event may include a series of steps for execution by the first web browser when the event occurs.

Additionally, the first web browser is connected to a plurality of other web browsers. The first web browser may be connected to the plurality of other web browsers using a communication channel, such as websockets. Websockets (also WebSocket) may be utilized in a browser to enable simultaneous, i.e. full-duplex, communication over a single TCP/IP connection. Thus, websockets enable two web browsers to communicate simultaneous and may be utilized by any client device. Thus, the first web browser may be connected to a plurality of other web browsers, including web browsers operating on separate user/client devices, in full-duplex communication so that messages may be instantly delivered between browsers.

Once the event is received, an element corresponding to the event is determined at step 504. A document object model element for the particular element may be determined, for example, a particular object in a document object model tree. The element on which the event acts may be captured using, for example, one of a unique identification, a cascading style sheet class name, and an XML path language.

Once, the particular object the event acts on is determined, the event and the element can be transmitted to a plurality of web browsers at step 506 for display on the same device or on different devices. The plurality of web browsers may then execute the same event on a corresponding element in order to obtain an execution of the event on each browser platform. The plurality of browsers may further correspond to a plurality of devices, for example, device specific browsers such as APPLE SAFARI® on APPLE IPHONE®. Additionally, a set of windows or a master window pane can be presented to a user which shows execution of the event on the webpage in each of the plurality of browsers. This helps the user to see and troubleshoot webpage creation and bug analysis.

Figure 6:
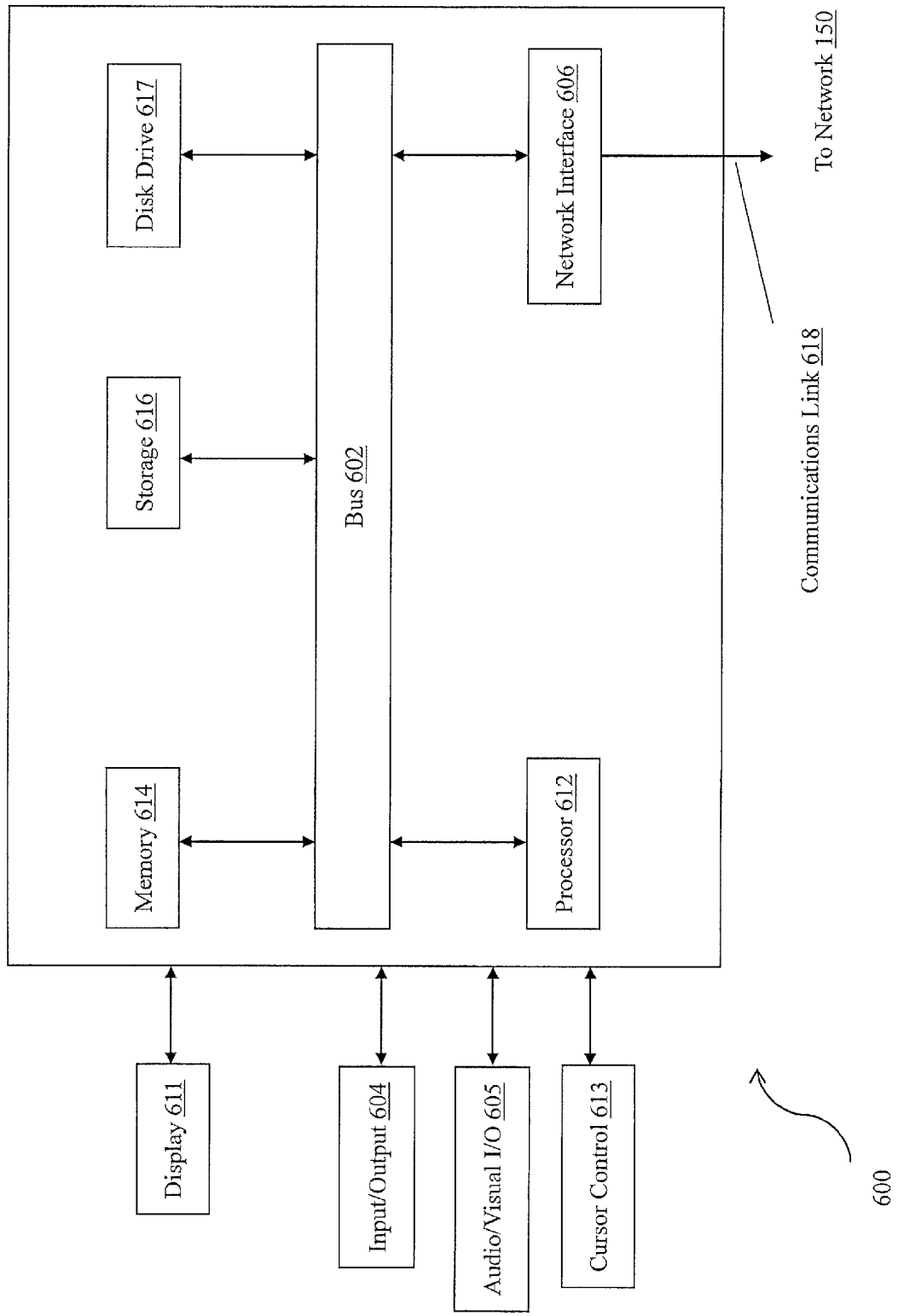
FIG. 6 is a block diagram of a computer system suitable for implementing one or more components in FIG. 1 according to one embodiment.

FIG. 6 is a block diagram of a computer system 600, for example device 100 of FIG. 1, suitable for implementing one or more embodiments of the present disclosure. In various embodiments, the user device may comprise a personal computing device (e.g., smart phone, a computing tablet, a personal computer, laptop, PDA, Bluetooth device, key FOB, badge, etc.) capable of communicating with the network. The payment provider may utilize a network computing device (e.g., a network server) capable of communicating with the network. It should be appreciated that each of the devices utilized by users and payment providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, a merchant server, or a payment provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A service provider system comprising:
 a non-transitory memory storing machine readable instructions for a plurality of web browsers; and
 one or more hardware processors coupled to the non-transitory memory and configured to read instructions from the non-transitory memory to cause the system to perform operations comprising:

establishing full duplex communication channels directly from a first web browser executing on a device and each of a plurality of web browsers, wherein the first web browser comprises a master browser window synchronized to the plurality of web browsers;

displaying the master browser window and interface windows for each of the plurality of web browser within a single graphical user interface of the device;

receiving an event within the first web browser, wherein the first web browser is connected to the plurality of web browsers through the full duplex communication channels;

determining an element on the first web browser corresponding to the event;

communicating the event and the element in real time over the full duplex communication channels to the each of the plurality of web browsers, wherein the each of the plurality of web browsers executes the event on a corresponding element to the element for each of the plurality of web browsers.

2. The system of claim 1, wherein the first web browser is connected to the plurality of web browsers using websockets.

3. The system of claim 1, wherein the element corresponds to a document object model element.

4. The system of claim 1, wherein the operations further comprise:
determining the element using one of a unique identification, a cascading style sheet class name, and an XML path language.

5. The system of claim 1, wherein the operations further comprise:
processing an execution of the event on the plurality of web browsers.

6. The system of claim 5, wherein the operations further comprise:
displaying the execution of the event on the plurality of web browsers on a plurality of windows within the application interface corresponding to each of the plurality of web browsers.

7. The system of claim 1, wherein the event corresponds to one of using a webpage search tool, engaging in an interactive game, playing a video, and playing a recording.

8. The system of claim 1, wherein at least one of the plurality of web browsers further corresponds to at least one device different than the device.

9. A method comprising:
establishing full duplex communication channels directly from a first web browser executing on a device and each of a plurality of web browsers, wherein the first web browser comprises a master browser window synchronized to the plurality of web browsers;

displaying the master browser window and interface windows for each of the plurality of web browser within a single graphical user interface of the device;

receiving a webpage event within the first web browser, wherein the first web browser is connected to a plurality of web browsers through the full duplex communication channels;

determining a webpage element on the first web browser corresponding to the webpage event;

communicating, using a hardware processor of a browser display device, webpage event and the webpage element in real time over the full duplex communication channels to the each of the plurality of web browsers, wherein the each of the plurality of web browsers executes the webpage event on a corresponding webpage element to the webpage element for each of the plurality of web browsers;

processing an execution of the webpage event on the plurality of web browsers; and displaying the execution of the webpage event on the plurality of web browsers on the interface windows within the single graphical user interface.

10. The method of claim 9, wherein the first web browser is connected to the plurality of web browsers using websockets.

11. The method of claim 9, wherein the webpage element corresponds to a document object model element.

12. The method of claim 9 wherein the determining the webpage element uses one of a unique identification, a cascading style sheet class name, and an XML path language.

13. The method of claim 9, wherein the event corresponds to one of using a webpage search tool, engaging in an interactive game, playing a video, and playing a recording.

14. The method of claim 9, wherein at least one of the plurality of web browsers further corresponds to at least one device different than the device.

15. A non-transitory machine readable medium having stored thereon machine-readable instructions executable to cause a computer to perform operations comprising:

establishing full duplex communication channels directly from a first web browser executing on a device and each of a plurality of web browsers, wherein the first web browser comprises a master browser window synchronized to the plurality of web browsers;

displaying the master browser window and interface windows for each of the plurality of web browser within a single graphical user interface of the device;

receiving a webpage event within the first web browser, wherein the first web browser is connected to a plurality of web browsers through the full duplex communication channels;

determining an element on the first web browser corresponding to the webpage event;

communicating executing the webpage event and the webpage element in real time over the full duplex communication channels to the each of the plurality of web browsers, wherein the each of the plurality of web browsers execute the webpage event on a corresponding webpage element to the webpage element for each of the plurality of web browsers;

processing an execution of the webpage event on the plurality of web browsers; and displaying the execution of the webpage event on the plurality of web browsers on the interface windows within the single graphical user interface.

16. The non-transitory machine-readable medium of claim 15, wherein the first web browser is connected to the plurality of web browsers using websockets.

17. The non-transitory machine-readable medium of claim 15, wherein the webpage element corresponds to a document object model element.

18. The non-transitory machine-readable medium of claim 17, wherein the determining the webpage element uses one of a unique identification, a cascading style sheet class name, and an XML path language.

19. The non-transitory machine-readable medium of claim 17, wherein the event corresponds to one of using a webpage search tool, engaging in an interactive game, playing a video, and playing a recording.

20. The non-transitory machine-readable medium of claim 17, wherein the plurality of web browsers further corresponds to a plurality of devices different than the device.

\* \* \* \* \*